(12) United States Patent
Huang

(10) Patent No.: US 7,688,200 B2
(45) Date of Patent: Mar. 30, 2010

(54) CONTAINER WITH FUNCTIONS OF LEVEL, CRUD AND TEMPERATURE DETECTIONS

(76) Inventor: Wei-Ting Huang, 235 Chung - Ho Box 8-24, Taipei (TW)

( * ) Notice: Subject to any disclaimer, the term of this patent is extended or adjusted under 35 U.S.C. 154(b) by 286 days.

(21) Appl. No.: 11/773,406

(22) Filed: Jul. 4, 2007

(65) Prior Publication Data

US 2009/0007659 A1     Jan. 8, 2009

(51) Int. Cl.
*G08B 21/00* (2006.01)
(52) U.S. Cl. .................. 340/540; 73/290 R; 73/291
(58) Field of Classification Search .............. 340/540; 73/290 R, 291, 292
See application file for complete search history.

(56) References Cited

U.S. PATENT DOCUMENTS

| | | | | |
|---|---|---|---|---|
| 4,353,245 A | * | 10/1982 | Nicolai | 73/49.2 |
| 4,672,540 A | * | 6/1987 | Waugh et al. | 700/90 |
| 5,717,337 A | * | 2/1998 | Kelly | 324/534 |
| 2002/0148410 A1 | * | 10/2002 | Thomas | 119/452 |
| 2007/0251960 A1 | * | 11/2007 | Al-Misfer | 222/590 |
| 2008/0314258 A1 | * | 12/2008 | Martin | 99/329 R |

* cited by examiner

*Primary Examiner*—Davetta W Goins
*Assistant Examiner*—Edny Labbees

(57) ABSTRACT

A container with functions of level, crud and temperature detections, comprises: a hollow casing having a receiving space at an upper side thereof; the casing being formed with a hollow space; a vent hole being formed at a bottom side of the casing for communicating the hollow space and exterior of the casing, an electric heating source installed in the hollow space of the casing and being tightly adhered to a wall of the hollow space below the receiving space; and a sensing and control circuit installed at a lower outer side of the casing; the sensing and control circuit including a microcontroller, an analog/digital converter, a gain amplifier, and a trigger circuit; and the wall of the casing being installed with at least one over level detection point, at least one level alarm detection point, at least one safety level detection point, at least one liquid temperature detection point, and at least one crud detection point.

2 Claims, 2 Drawing Sheets

CONTAINER WITH FUNCTIONS OF LEVEL, CRUD AND TEMPERATURE DETECTIONS

FIELD OF THE INVENTION

The present invention relates to containers, and particularly to a container with functions of level, crud and temperature detections, wherein the voltage difference from the liquid conductivity and impedance variation due to the heat expansion and cooling contraction effect are detected for sensing various physical properties of the liquid (including liquid level, temperature, and cruds accumulated) in the container so as to provide the information about liquid temperature, level and cruds in the container. Thus the present invention provides a container which can be operated safely and matching the requirement of environmental protection. The fire accident can be avoided.

BACKGROUND OF THE INVENTION

In the prior art heating container with temperature controlling function has a mechanical temperature controlling reed which is combined with a fuse. The fuse is installed at a fixed point of the container and is a constant temperature fuse. The liquid in the container will control the heating operation so as to retain the temperature in the container at a setting range.

However, the prior art design has the following disadvantages:

1. No level control function: when no liquid or low level is in the container, the reed switch can not determined these states, and thus it will be at a normal close state so that the heating process is retained and as a result, the container will be destroyed due to over heating.

2. When cruds are accumulated in the container, the reed switch and the constant temperature fuse will make fault determinations, and thus the liquid temperature in the container is lower or higher than the preset temperature range.

3. When the reed is fatigue or the joint is polluted, the temperature control of the container will lose of function.

SUMMARY OF THE INVENTION

Accordingly, the primary object of the present invention is to provide a container with functions of level, crud and temperature detections, wherein the voltage difference from the liquid conductivity and impedance variation due to the heat expansion and cooling contraction effect are detected for sensing various physical properties of the liquid (including liquid level, temperature, and cruds accumulated) in the container so as to provide the information about liquid temperature, level and cruds in the container. Thus the present invention provides a container which can be operated safely and matching the requirement of environmental protection. The fire accident can be avoided.

To achieve above objects, the present invention provides a container with functions of level, crud and temperature detections, comprising: a hollow casing having a receiving space at an upper side thereof, the casing being formed with a hollow space; a vent hole being formed at a bottom side of the casing for communicating the hollow space and exterior of the casing an electric heating source installed in the hollow space of the casing and being tightly adhered to a wall of the hollow space below the receiving space; and a sensing and control circuit installed at a lower outer side of the casing; the sensing and control circuit including a microcontroller, an analog/digital converter, a gain amplifier, and a trigger circuit; and the wall of the casing being installed with at least one over level detector, at least one level alarm detection point, at least one safety level detection point, at least one liquid temperature detection point, and at least one crud detection point.

Thereby when the container is heated, by above mentioned structure and components, the mechanisms of auto-heating, constant temperature control and level control are achieved.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
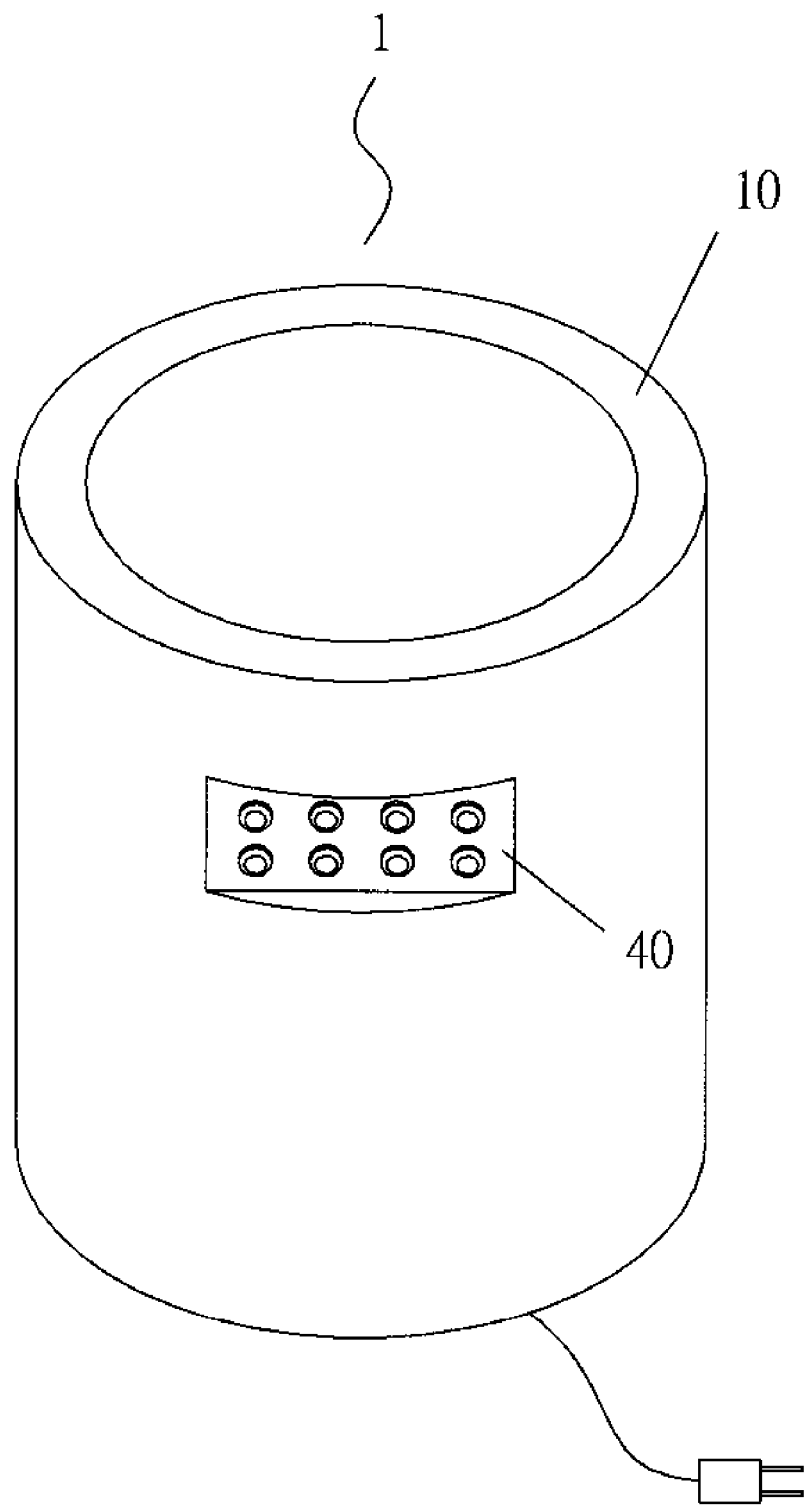
FIG. 1 is a perspective view of the present invention.
Figure 2:
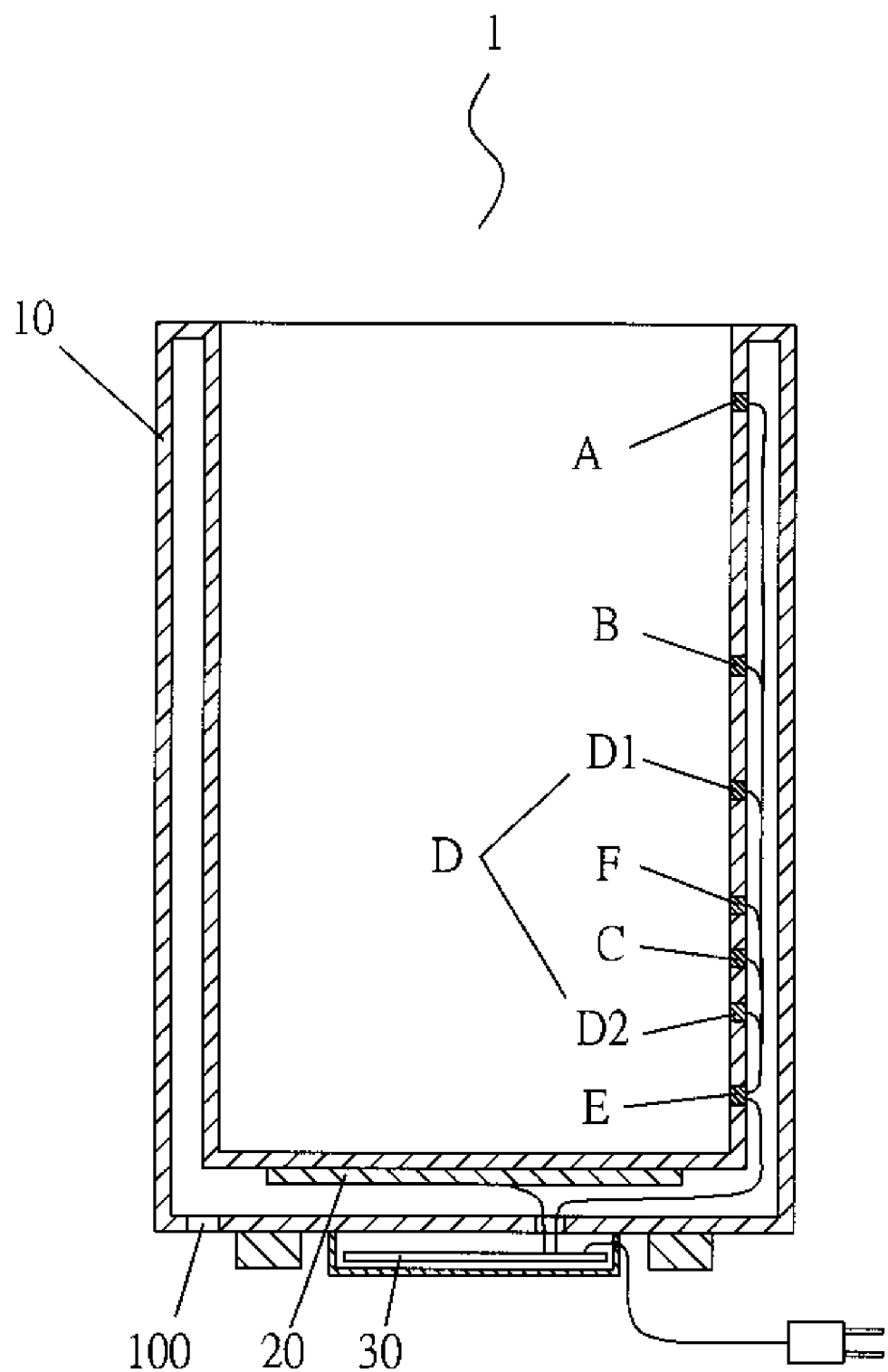
FIG. 2 is a schematic view showing the distribution of the detection points of the present invention.

The present invention provides a heating container with the function of detecting water level, curd and temperature. Referring to FIGS. 1 and 3, the container 1 of the present invention has the following elements.

A hollow casing 10 has a receiving space at an upper side thereof. The casing 10 is formed with a hollow space. A vent hole 100 is formed at a bottom side of the casing 10 for communicating the hollow space and exterior of the casing 10.

An electric heating source 20 is installed in the hollow space of the casing 10 and is tightly adhered to a wall of the hollow space below the receiving space.

A sensing and control circuit 30 is installed at a lower outer side of the casing 10. The sensing and control circuit 30 includes a microcontroller, an analog/digital converter, a gain amplifier, and a trigger circuit. The analog/digital converter serves to convert analog signals to digital signals. The microcontroller is a programmable operator which defines rules according to the user's algorithm. The gain amplifier serves to transfer the digital signals from various detectors to the trigger circuit and the analog/digital converter (ADC) so as to be as digital control signals. Then the signals are transferred to the microcontroller for further operation. The operated result signals are outputted through the display unit. The display unit 40 is a LED or liquid crystal display.

In the wall of the casing 10 is installed with at least one over level detection point A, at least one level alarm detection point B, at least one safety level detection point C, at least one liquid temperature detection point D, and at least one crud detection point F. The mechanisms of these detectors will be described hereinafter.

The over-level detection point A serves to cause the heating source 20 to stop the heating operation as the liquid within the container is over this detection point A.

The level alarm detection point B: when the liquid in the container is lower than this point, the trigger circuit in the heating source 20 will feedback a digital signal to a microcontroller and then an alarm signals is outputted to the display unit 40.

The safety level detection point C: when the liquid level in the container is lower than this point, the heating source 20 will stop the heating operation.

The liquid temperature detection point D: the liquid temperature detection point includes a high temperature detection point D1 and a liquid temperature detection point D2. Then the temperature in the container is between these two points, the heating source 20 will actuate for temperature preservation.

The crud detection point F: when the curds in the surface of the container will generate impedance effect in the heating process, the sensing and control circuit 30 will actuate to clean the container.

A liquid level common joint E: which is formed with a loop with above mentioned detection points and then a signal wire is extended to the sensing and control circuit 30. Thereby the variation of the impedance will feedback to the sensing and control circuit 30 in a shortest time period so as to have precise detecting result.

Advantages of the present invention will be described herein. The liquid level can be detected precisely. The container can be retained to a preset temperature range and detection result is precise. The curd can be detected and then the container is cleaned so as to have preferred heat conduction. The power consumption is reduced and thus it is matched to the requirement of environmental protection.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A container with functions of level, crud and temperature detections, comprising:
    a hollow casing having a receiving space at an upper side thereof; the casing being formed with a hollow space; a vent hole being formed at a bottom side of the casing for communicating the hollow space and exterior of the casing;
    an electric heating source installed in the hollow space of the casing and being tightly adhered to a wall of the hollow space below the receiving space;
    a sensing and control circuit installed at a lower outer side of the casing; the sensing and control circuit including a microcontroller, an analog/digital converter, a gain amplifier, and a trigger circuit; and a wall of the casing being installed with at least one over level detector, at least one level alarm detection point, at least one safety level detection point, at least one liquid temperature detection point, and at least one crud detection point; and
    wherein the analog/digital converter serves to convert analog signals to digital signals; the microcontroller is a programmable operator which defines rules according to the operation algorithm; the gain amplifier serves to transfer the digital signals from various detectors to the trigger circuit and the analog/digital converter (ADC) so as to be as digital control signals; then the signals are transferred to the microcontroller for further operation; and the operated result signals are outputted through the display unit;
    wherein the display unit is a LED or liquid crystal display;
    wherein the over level detection point serves to cause the heating source to stop the heating operation as the liquid within the container is over the detection point;
    the level alarm detection point causes that when the liquid in the container is lower than this point, the trigger circuit in the heating source will feedback a digital signal to a microcontroller and then an alarm signals are outputted to the display unit;
    the safety level detection point causes that when the liquid level in the container is lower than this point, the heating source will stop the heating operation; the liquid temperature detection point includes a high temperature detection point and a liquid temperature detection point; when the temperature in the container is between the high temperature detection point and liquid temperature detection point, the heating source will actuate for temperature preservation;
    the crud detection point causes that when the cruds ~in the surface of the container generates impedance effect in the heating process, the sensing and control circuit will actuate to clean the container; and
    a liquid level common joint formed with a loop with above mentioned detection points and then a signal wire is extended to the sensing and control circuit; and thereby the variation of the impedance will feedback to the sensing and control circuit in a shortest time period so as to have precise detecting result.

2. The container with functions of level, crud and temperature detections as claimed in claim 1, wherein a plurality of liquids temperature detection point are installed.

* * * * *